United States Patent Office
3,663,587
Patented May 16, 1972

3,663,587
BROMINATED SILOXANES AND THEIR
PREPARATION
Donald John Holman, Wedhey, Harlow, England,
assignor to Berk Limited, London, England
No Drawing. Filed Oct. 4, 1968, Ser. No. 765,006
Claims priority, application Great Britain, Oct. 18, 1967,
47,454/67
Int. Cl. C07f 7/04, 7/06, 7/18
U.S. Cl. 260—448.8 R    4 Claims

ABSTRACT OF THE DISCLOSURE

Stable brominated siloxanes having the formula $$R_x(Br_5C_6O)_{3-x}Si-O-Si(OC_6Br_5)_{3-x}R_x$$

in which R is alkyl and $x$ is 0, 1 or 2, are provided. These compounds are useful as fire retardant additives in polymer compositions.

---

This invention is concerned with certain novel brominated siloxanes, with a process for their preparation and with compositions containing them.

We have found that brominated siloxanes of the formula $$R_x(Br_5C_6O)_{3-x}Si-O-Si(OC_6Br_5)_{3-x}R_x \qquad I$$

in which R is an alkyl group containing from 1 to 6 carbon atoms and $x$ is 0, 1 or 2 ($OC_6Br_5$ is, of course, the pentabromophenoxy group), are good fire retardants for incorporation in synthetic polymer compositions to impart fire retardant properties thereto; a particular advantage of these brominated siloxanes is that they remain stable, unlike many of the currently available fire retardants for plastics, at elevated temperatures of up to 300° C. The brominated siloxanes are advantageously used, therefore, as fire retardant additives in polymer compositions which are processed, for example extruded, at high temperatures and/or are subjected in use to high temperatures.

The brominated siloxanes of Formula I are novel compounds and constitute one aspect of the present invention. A preferred compound of Formula I is hexa(pentabromophenoxy)disiloxane [$(Br_5C_6O)_3Si]_2O$. The compounds of Formula I are all solids having a high melting point.

In another aspect, the invention provides a process for preparing a brominated siloxane of Formula I which comprises oxidising a compound of the formula $$R_x(Br_5C_6O)_{3-x}SiCl \qquad II$$

wherein $x$ and R are as defined above, under mild oxidising conditions which are such as to effect cleavage of the Si—Cl bond without breaking this Si—O—C bond.

Suitable oxidising conditions are, for example, provided by the use of certain metal oxides, such as mercuric oxide, as the oxidising agent in the presence of an inert organic solvent, such as diethyl ether. The reaction is preferably carried out at an elevated temperature up to the boiling point of the reaction mixture.

The starting material of the formula $$R_x(Br_5C_6O)_{3-x}SiCl$$

can be prepared by condensing pentabromophenol with an alkylchlorosilane of the formula $R_xSiCl_{4-x}$, using substantially ($3-x$) mols of pentabromophenol per mol of alkylchlorosilane, in the presence of a suitable base, as acid binding agent, and an inert organic solvent. Preferred bases for this purpose are anhydrous ammonia (provided that it is adequately soluble in the organic solvent used), primary and secondary aliphatic and aromatic amines and their corresponding amides. It is particularly preferred to use bases of the foregoing types which do not contain a replaceable hydrogen atom attached to the nitrogen atom. The best yields are obtained by the use of dialkyl amides, such as dimethyl formamide, and diethyl and dimethyl acetamide.

The reaction is preferably carried out at an elevated temperature up to the boiling point of the reaction mixture. Suitable inert solvents are, for example, benzene and toluene.

In order that the invention may be more fully understood, the following example showing the preparation of a compound of Formula I is given by way of illustration only:

EXAMPLE

Preparation of hexa(pentabromophenoxy)disiloxane

Silicon tetrachloride (17 g., 0.1 mol) was added to pentabromophenol (154 g., 0.135 mol) in toluene (500 ml.) in the presence of dimethyl formamide (5 ml.). The mixture was refluxed for 3 hours, at the end of which time 98% of the theoretical hydrogen chloride had been evolved. The product was separated under nitrogen and dried under vacuum to give a white/buff solid which was predominantly chlorotris(pentabromophenoxy) - silane, M.P. 286–292° C. (dec.), 90% yield (Found: Br, 77.3; Cl, 3.0%, $C_{18}Br_{15}O_3ClSi$ requires: Br, 78.6; Cl, 2.3%).

Chlorotris(pentabromophenoxy)-silane (30.5 g., 0.02 mol) was treated with mercuric oxide (2.166 g., 0.01 mol) in refluxing ether for 4 hours, at the end of which time the yellow colouration had disappeared. Unreacted mercuric oxide (1.1 g., 50%) was isolated together with a solid (22.6 g.) having M.P. 380° C. (dec.). (Found: Br, 78.8%, $C_{24}Br_{30}O_7Si_2$ requires Br, 80.0%).

As indicated above, the compounds of Formula I impart fire retardant properties to synthetic polymer compositions in which they are incorporated.

In a further aspect, therefore, the invention provides a polymer composition comprising a synthetic organic polymer and, as fire retardant, a compound of Formula I.

The proportion of compound of Formula I to be used will depend upon the nature of the polymer (some, for instance, such as polyvinyl chloride, have inherent fire retardancy), the total bromine content of the fire retardant compound used and the degree of fire retardancy of the polymer composition it is wished to obtain, i.e. whether it is desired to obtain a self-extinguishing or a non-burning composition.

Generally it is necessary to add the fire retardant compound in an amount sufficient to provide a bromine content of at least 0.5% by weight, based on the weight of the polymer present in the composition alone, that is without taking into account any fillers, plasticisers, pigments or other additives that may be present in the composition. It is normally preferred to have a higher bromine content of from 5 to 10% by weight on the same basis; it is generally uneconomic to have a bromine content of more than 20% by weight of the polymer.

The effectiveness of the compounds of Formula I as fire retardants can be enhanced by also incorporating one or more of arsenic oxide and sulphide, antimony oxide and sulphide and organic antimonates in the polymer composition. Of these compounds, antimony oxide is preferred and it has been found that at least 1 part by weight of antimony oxide per 8 parts by weight of fire retardant is necessary to increase measurably the fire retardancy of the polymer composition as compared with the same polymer composition in which the fire retardant has been incorporated alone. It is preferred to add antimony oxide in the range of from 0.5 to 1.5:1 by weight of the fire retardant compound. Greater increase in fire retardancy can be achieved with a weight ratio of antimony oxide to fire retardant of 2 or more:1.

The fire retardant compound (and antimony or arsenic compound, if used) can be incorporated at any suitable stage in the manufacture of the polymer composition. Thus the fire retardant compound may be added to a monomer prior to polymerisation or, as may often be more convenient, to an already formed polymer. Other conventional constituents of polymer compositions, such as fillers, plasticisers, pigments and stabilisers, may also be incorporated.

The compounds of Formula I are particularly suitable for use as fire retardants in polyolefin, for example polyethylene, and polyester compositions.

I claim:

1. Brominated siloxanes of the formula $$R_x(Br_5C_6O)_{3-x}Si\text{---}O\text{---}Si(OC_6Br_5)_{3-x}R_x \quad \text{I}$$

wherein R is an alkyl group containing from 1 to 6 carbon atoms and $x$ is 0, 1 or 2.

2. Hexa(pentabromophenoxy)disiloxane.

3. A process for preparing a brominated siloxane of the formula $$R_x(Br_5C_6O)_{3-x}Si\text{---}O\text{---}Si(OC_6Br_5)_{3-x}R_x$$

wherein R is an alkyl group containing from 1 to 6 carbon atoms and $x$ is 0, 1 or 2, which comprises condensing pentabromophenol wtih an alkyl-chlorosilane of the formula $R_xSiCl_{4-x}$, the mole ratio of pentabromophenol to the alkylchlorosilane being substantially $(3-x):1$, in the presence of an inert organic solvent and of a base which is anhydrous ammonia, or a primary or secondary, aliphatic or aromatic amine or a corresponding amide, to provide a compound of the formula $$R_x(Br_5C_6O)_{3-x}SiCl$$

and oxidizing said compound under mild oxidizing conditions which are such as to effect cleavage of the Si—Cl bond without breaking the Si—O—C bond.

4. A process according to claim 3 wherein the base is dimethyl formamide or diethyl or dimethyl acetamide.

References Cited
UNITED STATES PATENTS

| | | | |
|---|---|---|---|
| 3,546,267 | 12/1970 | Ismail | 260—448.8 R |
| 3,492,328 | 1/1970 | Kötzsch | 260—448.8 R |

OTHER REFERENCES

Bazant et al., "Organosilicon Compounds," vol. 1, Academic Press, N.Y. (1965), pp. 46 and 54.

DANIEL E. WYMAN, Primary Examiner

P. F. SHAVER, Assistant Examiner

U.S. Cl. X.R.

260—45.7 R, 45.75 R, 448.8 A